United States Patent [19]

Newland

[11] 3,902,613
[45] Sept. 2, 1975

[54] DOUBLE-DECKED SNOWMOBILE TRAILER

[76] Inventor: Norman R. Newland, 1495 E. Sherren, North St. Paul, Minn. 55109

[22] Filed: July 5, 1973

[21] Appl. No.: 376,330

[52] U.S. Cl.............. 214/85.1; 105/368 R; 296/1 A
[51] Int. Cl.............................................. B60p 3/00
[58] Field of Search ........... 214/505, 450, 85, 85.1; 296/23 B, 1 A; 105/368 R, 340; 254/144; 187/8.59

[56] References Cited
UNITED STATES PATENTS

| | | | |
|---|---|---|---|
| 1,894,534 | 1/1933 | Dolan | 296/1 A |
| 1,925,535 | 9/1933 | Judd | 296/1 A |
| 2,432,228 | 12/1947 | Land | 214/85 |
| 2,815,131 | 12/1957 | Lunsman et al. | 254/144 |
| 3,116,844 | 1/1964 | Blunden et al. | 296/1 A |
| 3,677,425 | 7/1972 | Patten | 214/85.1 |

FOREIGN PATENTS OR APPLICATIONS

| | | | |
|---|---|---|---|
| 495,620 | 6/1954 | Italy | 214/85 |

*Primary Examiner*—Albert J. Makay
*Assistant Examiner*—Donald W. Underwood

[57] ABSTRACT

A double-decked snowmobile trailer in which the upper deck is pivotable about the forward end by means of a crank so as to combine the functions of a ramp and a lifting mechanism.

5 Claims, 8 Drawing Figures

DOUBLE-DECKED SNOWMOBILE TRAILER

BACKGROUND OF THE INVENTION

Snowmobile vehicles generally are not suitable for self propelled transportation about city streets in large metropolitan areas. As a consequence, the snowmobiles generally must be transported to a specialized area, usually outside of the city, where the terrain is suitable for snowmobile use. Toward this end the prior art practice is to provide some sort of trailer on which the snowmobiles may be transported. Snowmobiles are quite large and it is difficult to carry more than one snowmobile on a trailer. However, in cases where this has been done they are carried side by side on a simple flat framed trailer. But such trailers turn out to be wider than a car and somewhat dangerous. Also, to remain legal, it is necessary to place the trailer's wheels under the trailer making it higher and harder to load. In addition, loading such a trailer with side by side snowmobiles is difficult since the first snowmobile tends to unbalance the trailer and make it difficult to load the second snowmobile. It is much preferable to carry snowmobiles one on top of the other as in my invention since this provides a more balanced trailer. Also, the wheels can be mounted on the sides permitting the trailer to be much lower and therefore much more stable. However, it is very difficult to get a heavy snowmobile up a small ramp onto a conventional trailer and even more difficult to raise it to a second level without some type of external assistance such as a winch mounted separate from or on the trailer. My invention overcomes these disadvantages by providing a mechanism for loading snowmobiles vertically one above another in a unique two level trailer as described hereinafter.

SUMMARY OF THE INVENTION

Briefly, my invention contemplates an enclosed trailer sized to accept a snowmobile and having a loading ramp up to the back portion thereof. In addition, a ramp is pivoted on the front of the trailer at a location above the first snowmobile which ramp is just long enough so that when lowered it aligns with the rear loading ramp of the trailer. Thus, the first snowmobile can be driven up the rear loading ramp and on the pivoting overhead ramp toward the front of the trailer. The pivoting ramp is then raised by means of a hand winch so that the entire snowmobile is lifted up leaving the floor of the trailer clear to accept a second snowmobile. The rear loading ramp then folds up to form a tailgate which, in the vertical position, locks the upper pivoting ramp in a level position. With my invention, two snowmobiles are easily carried one above the other and loaded with a minimum of difficulty. Also, a cover is provided to convert my snowmobile trailer into an enclosed utility trailer. It may therefore be seen that it is an object of my invention to provide an improved snowmobile trailer which has the capability of carrying snowmobiles one above the other. It is a further object of my invention to provide a snowmobile trailer which through the use of a pivoting ramp is suitable for lifting the front end of a snowmobile high enough to gain access to the underside of the snowmobile for servicing and the like. Further objects and advantages will become apparent upon consideration of the following description and drawings.

DESCRIPTION OF THE PREFERRED EMBODIMENT

Figure 1:
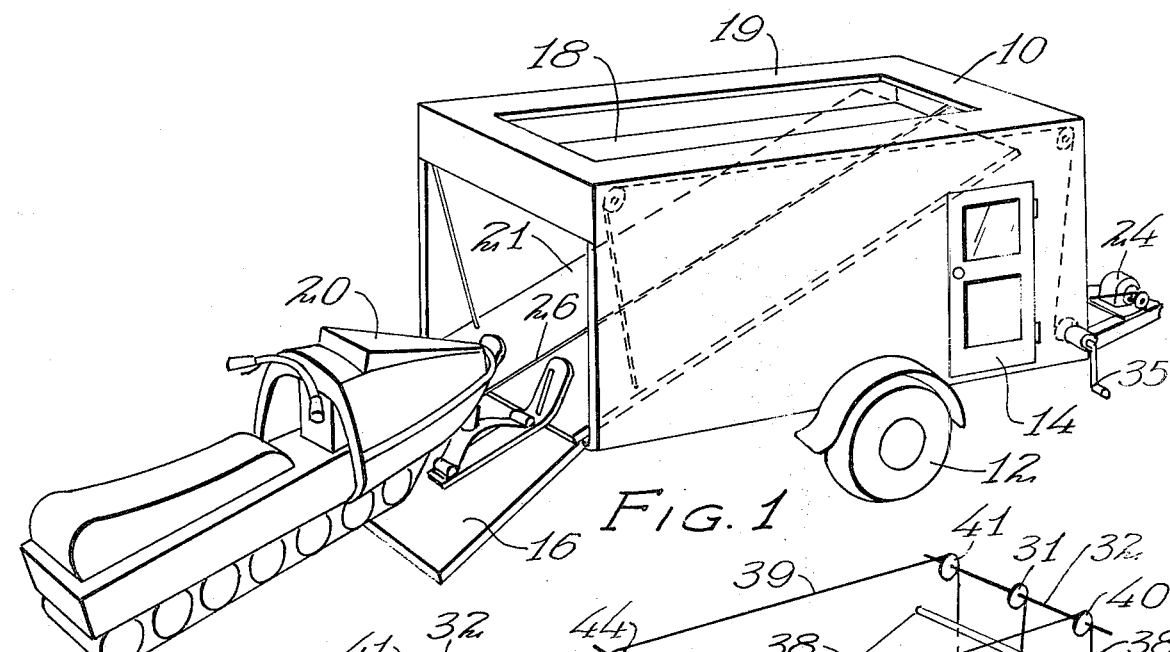
FIG. 1 is a perspective view of the trailer of my invention showing the pivoting ramp and the rear ramp in their lowered position ready to load the first snowmobile.

Referring to FIG. 1, a perspective view of the trailer of the present invention is shown. The trailer is designated by the numeral 10 and is provided with wheels 12 and, if desired, a small side access door 14. On the back of the trailer is a small fold down rear ramp 16 which is hinged to the bottom rear portion of the trailer in a manner well known to those skilled in the art. A rectangular hole 18 is provided in the roof 19 of the trailer to accommodate the snowmobile 20 when the pivoting ramp 21 is raised by means of the winch mechanism. Pivoting ramp 21 is hinged to the front wall of the trailer by means of a pair of conventional hinges 22 which are more readily visible in FIG. 5. Also in the cut away side view of FIG. 5 it may be seen that a small compartment 23 is provided at the front of the trailer to house a series of pulleys to accommodate the winch system. The winch system incorporates, for example a winch 24 which drives a pulley 25 connected to a cable 26. Winch 24 may comprise either a hand or motor operated winch as desired. Cable 26 passes over a pair of pulleys in compartment 23 and travels along the top of pivoting ramp 21 to assist in the loading of the snowmobile 20.

Figures 2, 3:
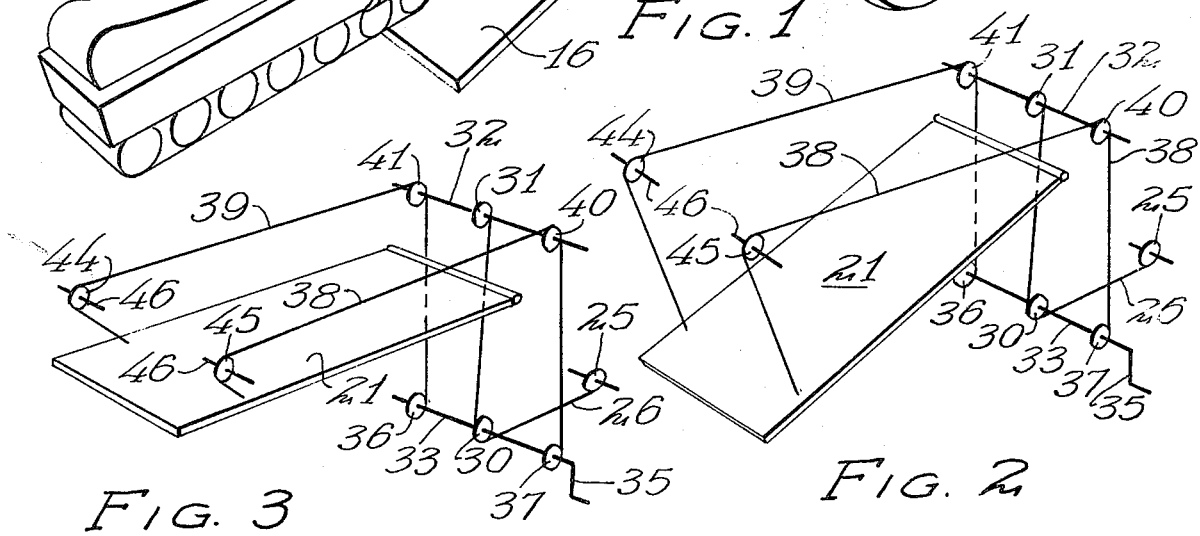
FIGS. 2 and 3 schematically show how the ramp and snowmobile winch systems operate.

The winch system is shown schematically in FIGS. 2 and 3. Referring to FIGS. 2 and 3 it may be seen that the pulleys for the winch comprise pulleys 30 and 31 mounted in compartment 23. These pulleys are mounted on a pair of axles 32 and 33 which are shown only schematically in FIGS. 2 and 3. After passing over pulley 30 and pulley 31 cable 26 travels down over the top of pivoting ramp 21 to be connected to the front of snowmobile 20 as is clearly shown in FIGS. 1 and 5. Thus, by the operation of winch 24, the snowmobile 20 may be pulled up over rear ramp 16 and onto pivoting ramp 21. In the alternative, the rear of the trailer can be tilted down by raising draw bar 27. A suitable hand crank 35 is provided at the side of trailer 10 which rotates axle 33. Mounted for rotation with axle 33 are a pair of wind up pulleys 36 and 37 upon which cables 38 and 39 are mounted. Cables 38 and 39 extend upward over a pair of pulleys 40 and 41 mounted for rotation about axle 32 in the same fashion as pulley 31. Cables 38 and 39 then extend backwards to a pair of pulleys 44 and 45. Pulleys 44 and 45 are mounted in small compartments 47 at the top rear portion of the trailer. Compartments 47 are more easily seen in the sectional side view of FIG. 5. From pulleys 44 and 45 cables 38 and 39 extend downward to be connected to the rear of pivoting ramp 21.

Figure 8:
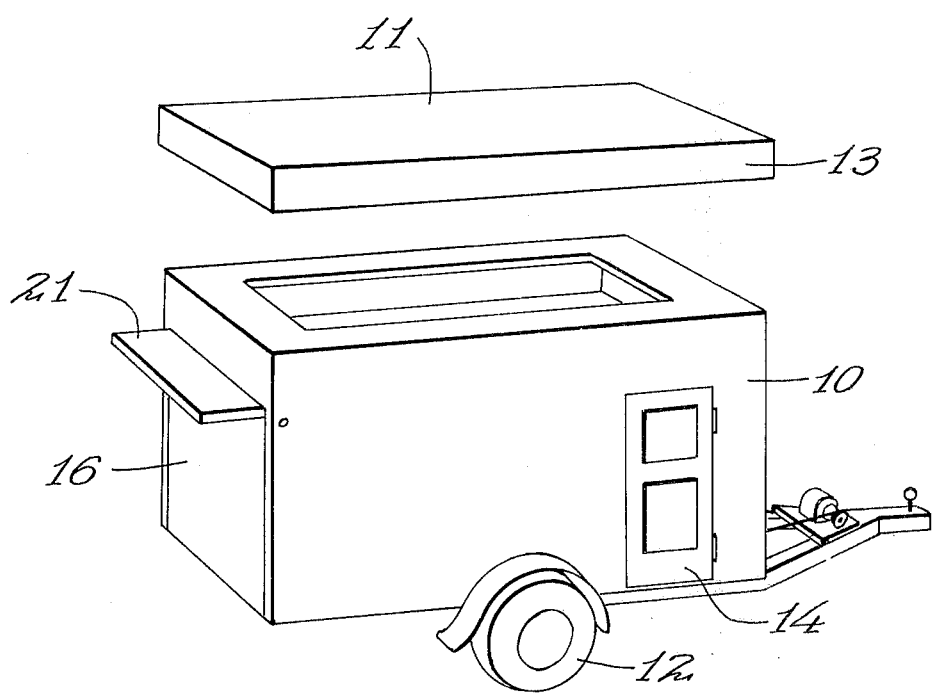
FIG. 8 is a perspective view showing how a cover may be used to convert the trailer into an enclosed utility trailer.

Compartments 23 and 47 together house all of the pulleys, cables, and other operating mechanisms so that when ramp 21 is raised, a complete unobstructed clear space is provided which permits the trailer to be used conveniently as a utility trailer. In this mode the upper compartment and the trailer as a whole may be protected by a cover 11 as shown in FIG. 8. Cover 11 may comprise a metal, wood, or plastic material formed with a circumferential edge 13 that fits about the outside walls of trailer 10. Cover 11 provides a tight weather seal so that when the trailer is used for utility purposes and no snowmobiles are in place, rain, dust, and other contaminents are kept away from the inside of the trailer and the operating mechanisms in the compartments in the top and front of trailer 10.

Figure 4:
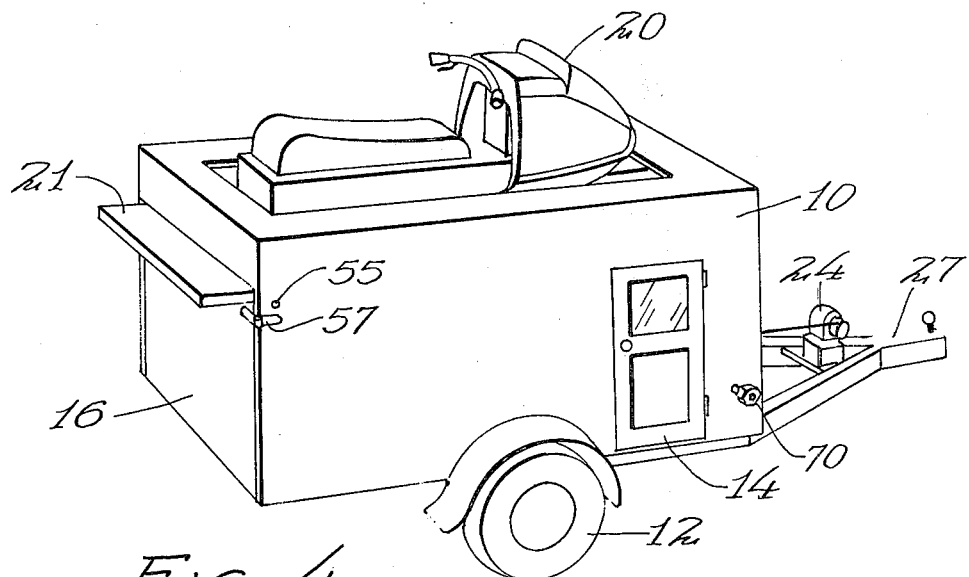
FIG. 4 shows the position of the first snowmobile when raised into the upper most position on top of the pivoting ramp.
Figure 5:
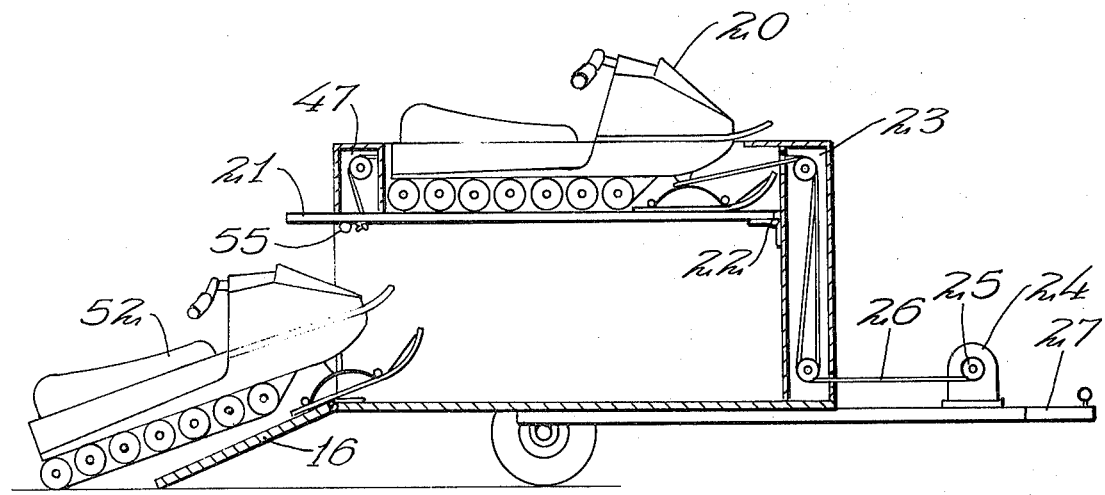
FIG. 5 is a sectional side view of the trailer of my invention showing the loading of the second snowmobile into the lower position.
Figure 6:
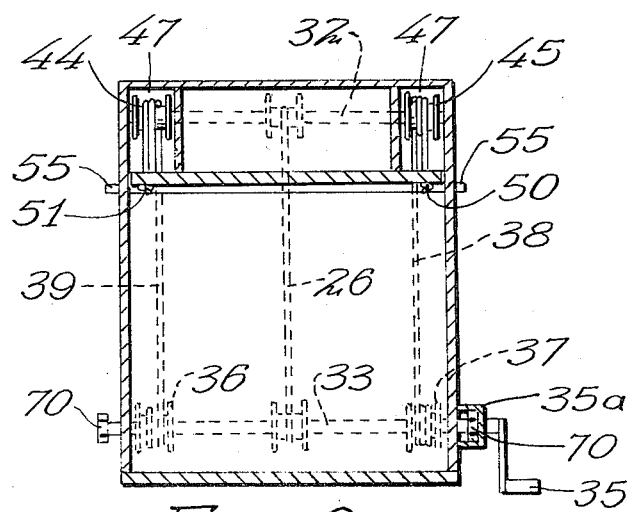
FIG. 6 is a sectional view of the trailer as viewed from the back end showing the location of the various components therein.

Thus, by the simple rotation of crank 35 cables 38 and 39 can be wound up on pulleys 36 and 37 thus raising pivoting ramp 21 into a horizontal position such as shown in FIG. 5. In this horizontal position the snowmobile 20 rests comfortably in place emerging from hole 18 on the top of trailer 10. An additional understanding of the cable and winch system may be had by reference to the sectional rear view of FIG. 6 wherein the position of axle 33 and crank 35 are more clearly shown. Wind up pulleys 36 and 37 are also shown therein along with the location of compartments 47 that house pulleys 44 and 45. It may also be seen that cables 38 and 39 are connected to the rear portion of pivoting ramp 21 by insertion through holes and connections to suitable retainers 50 and 51. In FIG. 6 it may further be seen that pulleys 44 and 45 are mounted upon short axles 46 extending across the width of compartments 47 whereas pulleys 40, 41 and 31 are mounted on a long axle 32 extending across the front of compartment 23. Once the first snowmobile 20 is raised into position the second snowmobile 52 may be driven up rear ramp 60 as shown in FIG. 5 and inserted inside the trailer underneath the first snowmobile 20. To insure that the pivoting ramp 21 is secure, a cross supporting rod 55 is inserted through holes in both sides of the trailer just underneath the rear portion of ramp 21 as shown in FIGS. 5 and 6. Once snowmobile 52 is moved into place underneath snowmobile 20 pivoting ramp 21 may be additionally secured by raising the rear ramp 16 into a vertical position so as to support pivoting ramp 21 as shown in FIG. 4. Since pivoting ramp 21 abuts rear ramp 16 in the lowered position, in the raised horizontal position it extends slightly beyond the rear of the trailer as shown in FIGS. 4 and 5. Any suitable latch 57 may be used to hold rear ramp 16 in place vertically. As shown in FIG. 4 crank handle 35 can be removed from axle 33 leaving only a projecting nut 70. The crank handle may then be conveniently stored inside the trailer or elsewhere. In FIG. 6 it may be seen that crank 35 incorporates a cup shaped member 35a which fits snugly over either of two nuts 70 which nuts are welded or otherwise secured to each end of axle 33. As a result crank 35 can be used to turn axle 33 from either end or if two cranks 35 are provided, from both ends.

Figure 7:
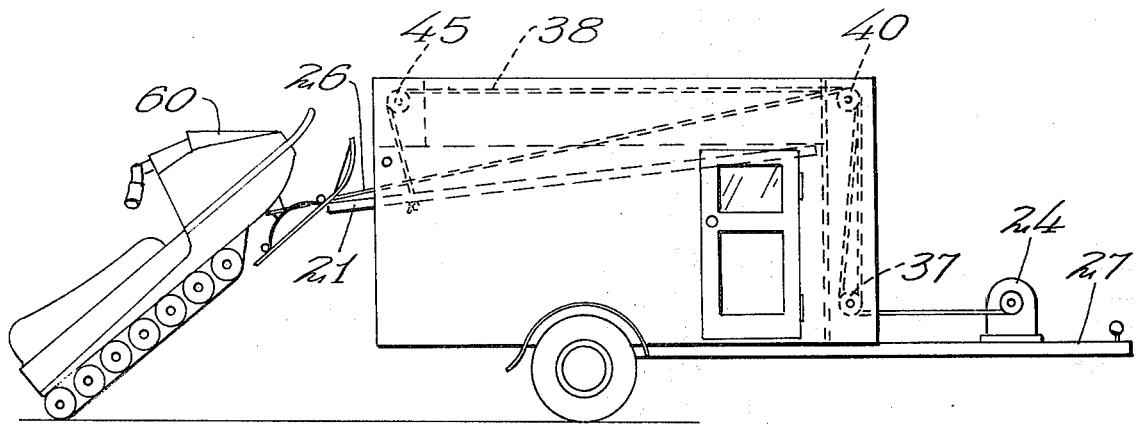
FIG. 7 is a side view of the trailer showing how it may be utilized to lift the front end of the snowmobile so as to provide servicing access underneath the snowmobile.

The trailer of my invention has additional utility in providing a convenient method for lifting the snowmobile for servicing to the bottom of the snowmobile. In FIG. 7 it may be seen that snowmobile 60 can be driven partially onto the rear portion of the pivoting ramp 21 or pulled thereon by means of winch 24 and cable 26. While the snowmobile is secured by cable 26, ramp 21 can be partially lifted with crank 35. This lifts the front end of the snowmobile as shown in FIG. 7 to afford easy access to the underside thereof for maintenance and service.

It may therefore be seen that an improved snowmobile trailer has been provided in which the snowmobiles can be carried vertically one on top of the other. Much of the construction is, of course, preferred only and many changes can be made without departing from the spirit and scope of the invention. For example, various other types of winch systems could be used which would work equally well including different placements of the pulleys and axles and different types of latches for securing the ramps in place. It should also be understood that a trailer may be provided which is approximately twice as wide so that two snowmobiles may be lifted up and two snowmobiles stacked underneath for a total of four snowmobiles on a single trailer. Because of the possible various modifications I do not intend to be limited to the particular apparatus shown except as defined by the appended claims.

I claim:

1. A snowmobile trailer comprising, in combination, a frame with side mounted wheels,
a drawbar at the forward end of said trailer,
a first platform on said frame to carry a first snowmobile generally between said side mounted wheels,
a second platform pivotally mounted on a horizontal axis between the sides of said frame,
a tailgate pivotally secured on a transverse axis to the rear of said first platform,
said second platform, when pivoted downwardly generally aligning with said tailgate to form an extension thereof, whereby,
a snowmobile moving upwardly along said tailgate may move from said tailgate onto said second platform,
first cable means overlying said second platform for drawing a snowmobile up said tailgate and onto said second platform,
second cable means operable independently of said first named cable means for swinging said second platform up with said snowmobile thereupon into generally parallel relation with said first platform, said second cable means being secured to the rear end of said second platform,
said tailgate acting as a ramp to permit a second snowmobile to be guided onto said first platform, and
means for supporting said tailgate in a generally vertical position beneath said second platform when both said snowmobiles are on said trailer,
said tailgate, when pivoted upwardly into substantially vertical position, extending beneath said second platform in raised position thereof and acts as a support for said second platform in raised position thereof, said second platform extending rearwardly beyond said tailgate when said tailgate is in raised position.

2. The structure of claim 1 and including means connected to said second cable means to raise said second platform.

3. The structure of claim 1 and in which said second cable means includes a pair of oppositely spaced cables secured to said second platform near the rear end thereof.

4. The structure of claim 3 and in which said first cable means is substantially centered relative to said oppositely spaced cables.

5. The structure of claim 1 and in which said frame includes a front wall, parallel side walls, and a top wall, said top wall including a hole through which said first snowmobile may extend.

* * * * *